United States Patent [19]
Reese

[11] 3,735,248
[45] May 22, 1973

[54] APPARATUS HAVING AUTOMATIC RE-SET MEANS FOR DETECTING A FAULT CURRENT

[76] Inventor: Robert L. Reese, 1009 Bryan Drive, South Euclid, Ohio

[22] Filed: Mar. 31, 1970

[21] Appl. No.: 24,302

[52] U.S. Cl.............324/51, 317/148.5 B, 324/52, 324/133, 340/253 R
[51] Int. Cl..........................G01r 31/02, G01r 31/08
[58] Field of Search.........................324/51, 133, 52, 324/102; 317/27, 18, 137, 149, 136, 150, 148.5; 340/248, 253, 255

[56] References Cited
UNITED STATES PATENTS

| | | | |
|---|---|---|---|
| 3,518,544 | 6/1970 | Tachick | 324/133 X |
| 3,328,683 | 6/1967 | Davenport et al. | 324/133 X |
| 3,356,939 | 12/1967 | Stevenson | 324/51 |
| 3,524,133 | 8/1970 | Arndt | 324/51 X |
| 3,443,158 | 5/1969 | Arndt | 324/52 X |
| 2,980,897 | 4/1961 | Meszaros | 340/248 |
| 3,525,038 | 8/1970 | Felt et al. | 324/51 |

*Primary Examiner*—Gerard R. Strecker
*Attorney*—William N. Hagg

[57] ABSTRACT

A device for detecting fault current. The device senses the current in a line and converts it to a proportional voltage signal. The voltage signal is used to switch a solenoid to first and second positions depending upon the value of the signal. The device will re-set itself after sensing a fault current when normal line current is restored.

3 Claims, 2 Drawing Figures

INVENTOR.
ROBERT L. REESE

INVENTOR.
ROBERT L. REESE

3,735,248

APPARATUS HAVING AUTOMATIC RE-SET MEANS FOR DETECTING A FAULT CURRENT

BACKGROUND OF INVENTION

This invention relates generally to current sensing devices for electrical systems, and more particularly to devices for indicating whether a fault current has passed a given point especially in an underground electrical distribution system.

In underground electrical distribution systems, the power distribution cables are buried beneath the ground. On occasion some type of fault may occur in this buried cable which will draw sufficient current to actuate overload current protective equipment such as fuses. Since the cable is buried, it is often difficult to determine the exact location of the fault. This determination of the location becomes even more complex when there are several distribution transformers, each serving a multiplicity of customers connected to the distribution system.

There have been several prior art proposals for fault current detection devices which can be utilized in conjunction with underground distribution systems, but none of them have proved to be completely satisfactory.

For example, some of these devices require manual resetting after the passage of each fault current which detracts substantially from their usefulness. Also, some prior devices have required their resetting to be a function of balancing of fluxes generated by the current and, hence, can be slow acting and, in fact, not completely resettable until a substantial current has been restored. These devices also may be subjected to rather high current flow which, under some conditions, could damage the devices.

SUMMARY OF THE INVENTION

According to the present invention, a fault current detecting and indicating device is provided which senses a current in a line at a given location, converts the sensed current to a proportional voltage signal, which voltage signal actuates a switching device. The indicating device has a first position when normal line current is present, and a second position when fault current has passed. Also, the switches will be maintained in their previously switched position when current in the line ceases. In addition, the device will reset to a normal position upon restoration of normal line current.

DESCRIPTION OF THE PREFERRED EMBODIMENT

In the following description, the device of the present invention will be described as utilized in an underground electrical distribution system. However, it is to be understood that it also may be used in other types of electrical systems, such as overhead systems, commercial and industrial systems, etc.

Figure 1:
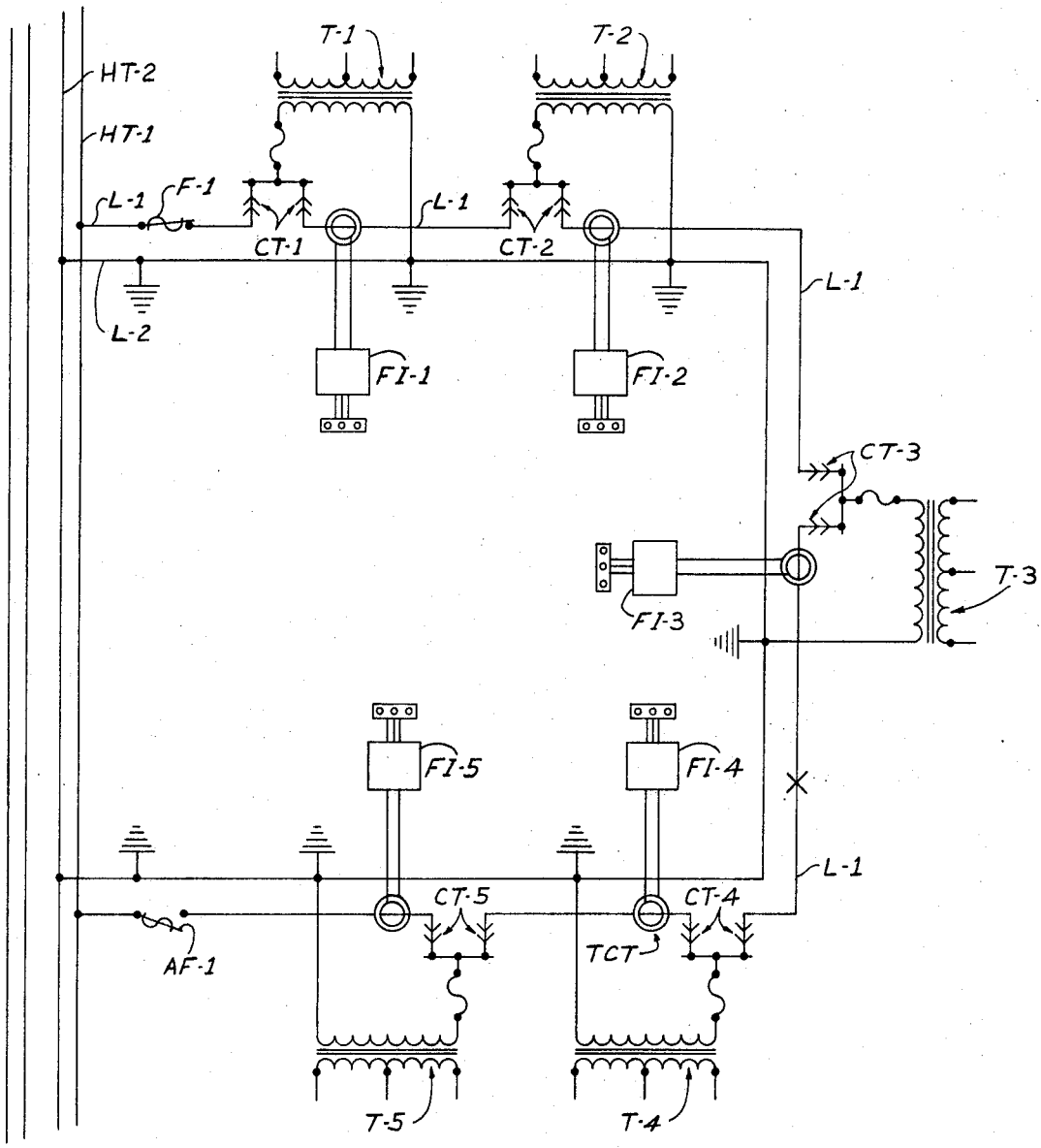
FIG. 1 is a line circuit diagram showing the distribution to a multiplicity of transformers from high tension lines through an underground distribution system wherein each of the transformers serves a multiplicity of customers, and further showing the incorporation of fault current detecting devices according to this invention.

Referring now to the drawings, and for the present to FIG. 1, an underground distribution system for supplying a multiplicity of transformers from a high tension line through an underground distribution system is shown wherein each of the transformers serves a multiplicity of customers. High tension lines are shown and designated as HT-1 and HT-2. Underground distribution lines L-1 and L-2 conduct current from the high tension lines to the underground distribution system, lines HT-2 and L-2 being grounded, and line L-1 having a primary overcurrent protective device in the form of a fuse F-1.

A multiplicity of transformers T-1, T-2, T-3, T-4 and T-5 are shown, each of which is connected to line L-1 through conventional cable terminations designated generally as CT-1 through CT-5 respectively and also directly to line L-2. Each of the transformers T-1 through T-5 are also protected by fuses, unnumbered, so that any overload in the specific system served by any transformer will actuate the fuse to that transformer and will not blow fuse F-1 for the whole system.

However, if any substantial fault occurs on line L-1, then the overload will blow fuse F-1. The determination must then be made as to exactly where the fault occurred so that the line may be dug up and necessary repairs made to correct the condition which caused the fault current. To indicate and bracket the location of the fault, a plurality of fault indicators FI-1 through FI-5 respectively are located on line L-1 preferably in proximity with the location of each of the cable terminations CT-1 through CT-5 respectively. These fault current indicators FI-1 through FI-5 may be incorporated in the cable terminations or may be located near by, or they may be located at any convenient location where there is easy access to the line L-1. (The location of fault current indicator FI-5 is such that it functions only when current is being supplied through auxiliary fuse AF-1, as will be described presently).

Each of the fault current indicators are so constructed that in the presence of normal line current, they will be in a first switched condition, but when fault current of a sufficient magnitude to blow fuse F-1 passes the location of the fault current indicator, the indicator will switch to a second switched position. Further, each of the fault current indicators is so constructed that, when line current drops to zero, such as after the fuse is blown, the fault current indicator will remain in its previously switched position; i.e., if it has sensed a fault and is in its second switch position, it will remain in this second position when a current goes to zero, or if it has not sensed a fault current but rather sensed normal line current, it will remain in its first or normal switched position when the line current drops to zero. Further, the fault current indicators are so constructed that they will switch to their normal or first position upon restoration of normal line current after the zero current or after fault current.

By the use of spaced fault current indicators, the location of a fault can be determined in the following manner: Assume that a fault has occurred in line L-1 at the position designated by X in FIG. 1, and current of sufficient magnitude is drawn to blow fuse F-1. In such instance, the fault current from high tension line HT-1 through L-1 would have passed the sensing coil of fault indicator FI-1, (which coil will be described in detail presently), the sensing coil of fault indicator FI-2, and the sensing coil of fault indicator FI-3. However, since the location of the fault is located ahead of the sensing coil of fault indicator FI-4, fault current would not have passed the sensing coil thereof. Therefore, when the fault current occurs, and the fuse has blown, the repairman can take an interrogation device, which will also be described in detail subsequently, and start serially interrogating the fault indicators. His indication upon interrogation of fault current indicators FI-1, FI-2 and FI-3 would each indicate that fault current had passed each one. The interrogation of fault current indicator FI-4 would indicate that no fault current had passed thereby. Therefore, the repairman would know that the fault had occurred somewhere between the cable termination CT-3 and CT-4 on line L-1. This area could be isolated by disconnecting cable terminations and the line dug and repaired.

In the meantime, normal power then could be restored by replacing the fuse F-1, and then feeding power to transformers T-4 and T-5 through auxiliary fuse AF-1 at the opposite end of the line, which is normally open, but which can be closed to supply current thereto in such an emergency.

Figure 2:
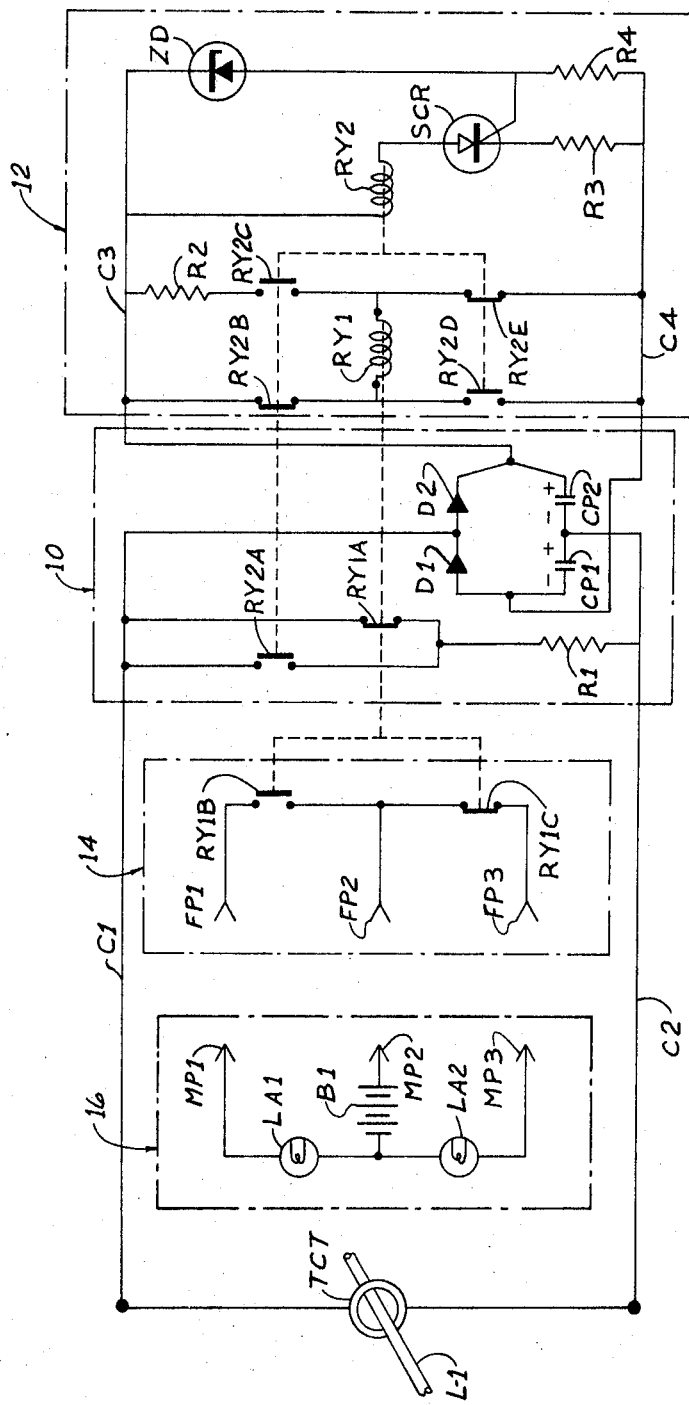
FIG. 2 is a circuit diagram of a fault current detecting device according to this invention.

Turning now to FIG. 2, the circuitry of the fault indicating device according to this invention, is shown in detail. The fault indicating device includes a sensing coil in the form of a torroidal current transformer designated as TCT which is adapted to sense the current in line L-1 and develop a current proportional thereto in conductors C1 and C2. The conductors C1 and C2 lead to a protection and conversion section of the indicating device shown in dot-dash outline generally designated as 10, in which section protective resistance and switches therefor are provided to prevent too great a voltage or current being impressed on the instrument, and also in which a diode-capacitor network is provided which is adapted to convert the sensed current to a proportional voltage.

The sensed voltage is impressed on an actuating section of the indicator shown in dot-dash outline generally designated as 12, in which section switching action is effected responsive to the sensed voltage in which a first switched position is effected when the sensed voltage is that of normal line current, but a second switched position is effected when the voltage represents a fault current. The switched position will automatically be reset to the first position after restoration of normal line current.

The switching action in the actuating section 12 actuates switches in the interrogation section of the fault current indicator shown in dot-dash outline designated generally as 14. This section has switches and connections therefor which can be interrogated by a portable interrogation device designated generally as 16. This interrogation device 16 is shown in dot-dash outline, but it is to be understood that this is a separate instrument from remainder of the circuit, the dot-dash outline being shown to avoid the use of solid lines which could be confusing with the electrical circuitry.

Referring now to the circuitry in detail, the protection and conversion section 10 receives current from the current transformer TCT through conductors C1 and C2 which is proportional to the current in line L-1. The protection and conversion section includes a protective resistor R1 which is connected directly to conductor C2 and through parallel connected switches RY1A and RY2A to conductor C1. Also, the protection and conversion section includes a diode and capacitor network comprised of diodes D1 and D2 and capacitors CP1 and CP2 which function to convert the sensed current in conductors C1 and C2 to a proportional voltage signal, and supply this voltage signal to conductors C3 and C4 in the actuating section 12.

The actuating section 12 includes a first relay coil RY1 which is a latching relay and a second relay coil RY2 which is a non-latching relay coil. Relay coil RY1 is connected between conductors C3 and C4 by means of switches RY2B, RY2C, RY2D and RY2E. Switch RY2C is connected to conductor C-3 through resistor R2. The relay coil RY2 is connected between conductors C3 and C4 in series with a silicon controlled rectifier SCR, and resistor R3. Also connected in series between conductors C3 and C4 are a zener diode ZD and resistor R4. The zener diode and silicon controlled rectifier are interconnected so that when the zener diode reaches conducting level, it will gate the silicon controlled rectifier to allow current to pass through relay coil RY2.

The interrogation section 14 includes a pair of switches RY1B and RY1C connected in circuit relationship with female plug connectors FP1, FP2 and FP3.

When the device is receiving normal line current, the switches are in the position shown with the relay coil RY1 being energized through switches RY2B and RY2E, and the relay coil RY2 being de-energized by virtue of the fact that the zener diode is selected to be such a value that it will be non-conductive at the voltage developed with normal line current. The switch RY1A is closed which places resistance R1 in the circuit to protect the circuit from receiving high voltage or high current.

When the torroidal current transformer TCT senses a current which is high enough to actuate the overload protection device, this current, which will be referred to as a fault current, is impressed as a proportional voltage on conductors C3 and C4, and the value of the components are selected so that this voltage will be higher than the operating voltage of the zener diode ZD. This will cause the zener diode to conduct, which in turn will cause the silicon controlled rectifier SCR to become conductive. The current through the silicon controlled rectifier then will cause relay coil RY2 to become energized. This will cause a switching action to occur in the switches which are controlled by relay coil RY2. This switching action will open switches RY2B and RY2E and close switches RY2C and RY2D. Resistor R2 serves as a protection device, protecting the relay coil RY1 from excessive current, since it is a higher voltage that switches RY2C and RY2D are switched into the circuit. This opening of switches RY2B and RY2E and closing of switches RY2C and RY2D will cause a reversal of the current in the relay coil RY1, which will cause the relay coil RY1 to actuate to its opposite latched position which then closes switch RY1B and opens switch RY1C. The actuation of relay coil RY2 will also cause switch RY2A to close, and the switching of relay coil RY1 in response to the actuation of relay coil RY2 will cause switch RY1A to open.

As indicated previously, the fault current will normally cause the fuse to blow, which will then cause an immediate drop to zero of the current in the line. This drop to zero will then cause the silicon controlled rectifier to become non-conductive and will also de-energize relay coil RY2. Since relay coil RY2 is a non-latching relay, it will return to its original position, closing contacts RY2B and RY2E and opening contacts RY2C and RY2D. This return to the normal position will also open contact RY2A.

However, since relay coil RY1 is a latching relay coil, it will not reverse positions when it is de-energized, and hence the switch RY1A will remain open in the protection and conversion section, and in the interrogation section 14 the switch RY1B will remain closed and switch RY1C will remain open. Hence, after the passage of fault current, the switches RY1B and RY1C will have reversed positions, and they will remain in this reversed position even when the current goes to zero due to the blowing of the fuse in line L-1.

In order to interrogate the device to find out which positions switches RY1B and RY1C are in, an interrogation device 16 is provided which includes a pair of lamps LA1 and LA2 connected in circuit relationship with a battery B1. The battery and lamps are connected in circuit relationship with male plugs MP1 and MP2 and MP3 which are positioned and configured to be inserted into female plugs FP1, FP2 and FP3 in the interrogation section 14. Thus, to interrogate the fault current indicator, the interrogation device 16 is plugged into the interrogation section 14 of the fault current indicator. If no fault current has passed, the switches RY1B and RY1C will be in the positions shown in FIG. 2. In such case, lamp LA2 will light, and lamp LA1 will remain unlit since there is a complete circuit through switch RY1C but an open circuit through switch RY1B. Preferably, the lamps LA1 and LA2 are of different colors and conventionally lamp LA2 would be colored green, and lamp LA1 would be colored red. Thus, if lamp LA2 lights, and lamp LA1 does not light, there will be a green light indicating that no fault current had passed the point at which the fault current indicator is located. However, if fault current had been detected by the fault current indicator, even though the fuse had blown subsequently, the switches RY1B and RY1C would be reversed, i.e., RY1B would be closed and RY1C would be open. With this condition, LA1 would light because of a completed circuit through switch RY1B, but lamp LA2 would not light because of the open circuit through switch circuit RY1C. This then would give a red light indication that fault current had passed.

While it would be possible to use but a single switch in the interrogation section and use a lamp and battery to detect whether the switch is open or closed, such an arrangement would be susceptible to reading errors. For example, with a single lamp and battery used for interrogation, the lamp could be arranged to glow if the switch were closed, but not glow if the switch were open. However, a non-glow reading would occur if the lamp were burned out or there were other circuit failures even if the switch were closed. Hence, the two-switch, two-lamp system is preferred in which a positive indication is given for each condition.

As indicated above, one of the principal desirable features of a fault current indicator is that it automatically resets itself upon restoration of normal line current and reset quickly. The device of the indicator shown in FIG. 2 will reset itself in the following way. First, it will be remembered that while a fault current is passing, switches RY2C and RY2D were closed, and switches RY2B and RY2E were open, thus reversing the direction of flow of the current in relay coil RY1 and causing it to actuate to its reversed latched position. When the current went to zero, the relay coil RY2 ceased to be conductive and hence returned to its normal position, returning switches RY2B and RY2E to their closed position, and RY2C and RY2D to the open position. Also, upon de-energization of relay coil RY2 switch RY2A will return to its open position. However, relay coil RY1, being a latching relay, was latched in its reversed position. Hence, after the passage of fault current, and after the fuse is blown and the current has gone to zero, switches RY2A, RY2B, RY2C, RY2D and RY2E are in their positions shown in FIG. 2, whereas switches RY1A, RY1B and RY1C are in the opposite positions from that shown in FIG. 2. Therefore, after passage of fault current and after the current goes to zero, both switches RY1A and RY1B are open removing resistor R1 from the circuit. Thus, since the resistor R1 is removed, the device will be immediately sensitive to the first small amount of restored line current, and when this line is restored, the voltage will immediately be impressed across conductors C3 and C4, energizing relay coil RY1 through switches RY2B and RY2E. This will reverse the direction in which relay coil RY1 was previously energized, returning it to its normal position, shown in FIG. 2. Thus, contact RY1A will close putting protection resistor R1 in the circuit, and contact RY1B will open, and contact RY1C will close, indicating the sensing of normal line current.

In summary, the current transformer senses a current in the line 1, and this current is directed to the protection and conversion section wherein it is converted to a proportional voltage which is impressed on the actuating section 12. If the voltage is below that representative of a current which would indicate a fault, the zener diode is non-operative, and the relay coil RY2 is de-energized, and the relay coil RY1 is energized with the switches in the position shown in FIG. 2, maintaining the switches RY1B and RY1C in the positions shown in FIG. 2. When a current which is of sufficient magnitude to blow the fuse is detected, this will be converted by the protection and conversion section 10 to proportional voltage of sufficient magnitude to operate the zener diode which in turn will cause the silicon controlled rectifier to conduct thus energizing the relay coil RY2 which will reverse the switches RY2B and RY2C, RY2D and RY2E, thus reversing the polarity of relay coil RY1, which in turn will reverse the positions of RY1C and RY1B and will close switch RY2A and open switch RY1A. When the current goes to zero, relay coil RY1 being a latching relay will maintain the switches in the reversed position, allowing interrogation. However, relay coil RY2 will be deenergized and thus will return switches RY2A, RY2B, RY2C, RY2D and RY2E to positions shown in FIG. 2. Upon restoration of normal line current, the current and relay coil RY1 will again be reversed, which will cause the relay coil to latch in its opposite and normal position, returning the switches RY1A, RY1B and RY1C to the positions shown in FIG. 2. Hence, interrogation of interrogation section 14, after a fault current has caused a fuse to blow and current has gone to zero, will indicate whether the fault indicator has sensed the passage of this fault current, thereby allowing the bracketing of the location of the fault in a line.

I claim:

1. A device for detecting that a fault current of at least a given value has passed a point on the circuit conductor and for storing that information for future interrogation for the purpose of locating the locality of a fault, comprising, current transformer means for sensing the current in the conductor, means for converting said sensed current into a proportional voltage signal, first relay means having first and second latched positions, actuating means responsive to said voltage signal disposed to actuate said first relay means from either position it may occupy to said first positions when said voltage signal is below the level corresponding to said given value of the current and to said second position when said voltage signal is at and above the level corresponding to said given current value and to maintain the relay in its previously latched position in the absence of a voltage signal, said actuating means including voltage sensitive diode means coupled to said converting means and adapted to conduct only at and above the voltage corresponding to said given current value, and second relay means connected to and operated by said voltage sensitive diode means for controlling the actuation of said first relay means, and means operably connected to said first relay means disposed to indicate which position said first relay means is in.

2. The invention as defined in claim 1 wherein said actuating means includes switch means in series circuit relationship with said first named relay means.

3. THe invention as defined in claim 2 further characterized by said switch means being disposed to direct current to said first named relay means in a first direction when said second named relay means is not operated by said voltage sensitive diode means and in the opposite direction when said relay is operated by said diode means.

* * * * *